US009531212B2

(12) United States Patent
Hongo et al.

(10) Patent No.: US 9,531,212 B2
(45) Date of Patent: Dec. 27, 2016

(54) SECONDARY BATTERY SYSTEM AND CHARGE AND DISCHARGE METHOD FOR THE SAME

(75) Inventors: Hiroo Hongo, Tokyo (JP); Kenji Kobayashi, Tokyo (JP); Koji Kudo, Tokyo (JP); Kenichi Ishii, Tokyo (JP); Takayuki Nyu, Tokyo (JP)

(73) Assignee: NEC CORPORATION, Tokyo (JP)

(*) Notice: Subject to any disclaimer, the term of this patent is extended or adjusted under 35 U.S.C. 154(b) by 439 days.

(21) Appl. No.: 13/810,835

(22) PCT Filed: Jun. 13, 2012

(86) PCT No.: PCT/JP2012/065091
§ 371 (c)(1),
(2), (4) Date: Jan. 17, 2013

(87) PCT Pub. No.: WO2013/038763
PCT Pub. Date: Mar. 21, 2013

(65) Prior Publication Data
US 2013/0175997 A1    Jul. 11, 2013

(30) Foreign Application Priority Data

Sep. 15, 2011  (JP) ................................ 2011-202093

(51) Int. Cl.
*G06F 17/50* (2006.01)
*H02J 7/00* (2006.01)
(Continued)

(52) U.S. Cl.
CPC .............. *H02J 7/007* (2013.01); *H01M 10/44* (2013.01); *H01M 10/441* (2013.01);
(Continued)

(58) Field of Classification Search
CPC ...................................................... H02J 7/007
(Continued)

(56) References Cited

U.S. PATENT DOCUMENTS 8,415,954 B2 *   4/2013   Akamine ............. G01R 31/361
                                                                320/132
2010/0207580 A1   8/2010   Nishida et al.
(Continued)

FOREIGN PATENT DOCUMENTS

EP       1 837 944 A2    9/2007
EP       2192649 A1      6/2010
(Continued)

OTHER PUBLICATIONS

International Search Report for PCT/JP2012/065091 dated Sep. 11, 2012.
Written Opinion for PCT/JP2012/065091 dated Sep. 11, 2012.
Communication dated Mar. 3, 2015, issued by the European Patent Office in corresponding application No. 12803503.7.

*Primary Examiner* — Thuan Do
(74) *Attorney, Agent, or Firm* — Sughrue Mion, PLLC (57) ABSTRACT

A secondary battery has a progressively degrading SOC that is an SOC at which the battery performance degrades during storage, and is charged and discharged by a controller. An information processor holds a first threshold value set in advance and lower than the progressively degrading SOC of the secondary battery, and a second threshold value set in advance and higher than the progressively degrading SOC, makes the controller continue an operation to charge the secondary battery from the first threshold value to the second threshold value at the time of charging the secondary battery based on the value of the SOC of the secondary battery detected by the controller, and makes the controller continue an operation to discharge the secondary battery from the second threshold value to the first threshold value at the time of discharging the secondary battery based on the value of the SOC of the secondary battery detected by the controller.

15 Claims, 4 Drawing Sheets (51) Int. Cl.
- H01M 10/44 (2006.01)
- H01M 10/48 (2006.01)
- H02J 3/32 (2006.01)
- *H01M 4/505* (2010.01)
- *H01M 10/052* (2010.01)
- *H01M 10/42* (2006.01)

(52) U.S. Cl.
CPC ......... H01M 10/48 (2013.01); H01M 10/482 (2013.01); H02J 3/32 (2013.01); H02J 7/0013 (2013.01); H02J 7/0063 (2013.01); H02J 7/0073 (2013.01); *H01M 4/505* (2013.01); *H01M 10/052* (2013.01); *H01M 2010/4271* (2013.01); *H02J 7/0021* (2013.01); *H02J 2007/0067* (2013.01); *Y02T 10/7011* (2013.01); *Y02T 10/7055* (2013.01)

(58) Field of Classification Search
USPC .......................................................... 320/134
See application file for complete search history.

(56) References Cited

U.S. PATENT DOCUMENTS

| | | | |
|---|---|---|---|
| 2011/0156652 A1* | 6/2011 | Kishiyama | B60L 11/1824 320/132 |
| 2012/0159220 A1* | 6/2012 | Winkler et al. | 713/323 |

FOREIGN PATENT DOCUMENTS

| | | |
|---|---|---|
| EP | 2410602 A1 | 1/2012 |
| JP | 10-123225 A | 5/1998 |
| JP | 2000-30751 A | 1/2000 |
| JP | 2001-307781 A | 11/2001 |
| JP | 2007-259612 A | 10/2007 |
| JP | 2009-70777 A | 4/2009 |
| JP | 2010-97760 A | 4/2010 |
| WO | 2011016273 A1 | 2/2011 |

* cited by examiner

SECONDARY BATTERY SYSTEM AND CHARGE AND DISCHARGE METHOD FOR THE SAME

CROSS REFERENCE TO RELATED APPLICATIONS

This application is a National Stage of International Application No. PCT/JP2012/065091 filed Jun. 13, 2012, claiming priority based on Japanese Patent Application No. 2011-202093 filed Sep. 15, 2011, the contents of all of which are incorporated herein by reference in their entirety.

TECHNICAL FIELD

The present invention relates to a secondary battery system that controls charging and discharging of a secondary battery and to a charge and discharge method for the secondary battery system.

BACKGROUND ART

Lithium-ion secondary batteries using occlusion and release of lithium ions have advantages including an energy density higher than those of nickel-cadmium (Ni—Cd) batteries and nickel-hydrogen (Ni—MH) batteries having the same capacity and a high operating voltage and are, therefore, being widely used in information processing devices and communication device, such as personal computers and portable telephones, which need to be reduced in size and weight.

In recent years, use of a lithium-ion secondary battery as a power source for an electric vehicle, a hybrid vehicle or the like has been studied. Further, use of a lithium-ion secondary battery as a battery for storing electric power generated by a renewable power source such as a solar battery or wind power generation that is being introduced for realization of low-carbon society in view of the global warming problem is also being studied.

Putting a lithium-ion secondary battery into widespread use for power storage or as a large power source for an electric vehicle or the like requires not only reducing the manufacturing cost but also reducing the cost required for maintenance or the like. In a scheme to do so, it is important to extend the product life.

Although it is thought that the product life of lithium ion secondary batteries can be extended by re-evaluating the materials that comprise them and the structure of the batteries, there is a method that can reduce the shortening of their product life cycles that is caused by inappropriate usage of the battery and so forth. For example, Patent Literature 1 and Patent Literature 2 propose techniques that reduce the shortening of the life cycles of lithium ion secondary batteries by controlling charging and discharging of these batteries.

Patent Literature 1 describes controlling charging and discharging of a lithium-ion secondary battery so that the amount of lithium ions moving between a positive-electrode active material and a negative-material active material during charging and discharging is equal to or smaller than 95% of the amount of lithium ions that move in the reverse direction.

Patent Literature 2 describes controlling charging and discharging of a lithium-ion secondary battery so that the discharge end voltage at the time of discharging is 3.2 to 3.1 V and the upper limit voltage at the time of charging is 4.0 to 4.5 V.

Lithium-ion secondary batteries using lithium cobaltate, lithium manganate or lithium nickelate as a positive-electrode material (positive-electrode active material) are known. Lithium-ion secondary batteries using a graphite-based material or a coke-based material as a negative-electrode material (negative-electrode active material) are also known.

The applicant of the present invention has found that when a manganese-based lithium-ion secondary battery using lithium manganate as a positive-electrode material in such lithium-ion secondary batteries is stored in a particular state of charge (SOC), the battery performance degrades rapidly (the battery capacity is reduced).

"SOC" represents the ratio of an amount of electricity with which a lithium-ion secondary battery is charged to the capacity of the lithium-ion secondary battery. The particular SOC at which the battery performance degrades rapidly is a value of, for example, SOC=approximately 40%, lower than the maximum SOC, which is a charge limit point, and higher than the minimum SOC, which is a discharge limit point. "Storage" referred to in the specification of the present invention means leaving a lithium-ion secondary battery in a state at the SOC value.

Degradation of the battery performance of a lithium-ion secondary battery at such a particular SOC is not a serious problem when the battery is used in a mode of use in which the battery is ordinarily stored in a fully charged state, that is, when the battery is used as an uninterruptible power supply (UPS) or the like.

However, in a mode of use in which a lithium-ion secondary battery is stored at an arbitrary SOC between the maximum SOC and the minimum SOC, for example, in use for storing electric power generated by the above-described renewable power source, there is a possibility of the battery being stored at the above-described particular SOC. In such a case, the battery performance of the lithium-ion secondary battery degrades rapidly.

RELATED ART LITERATURE

Patent Literature

Patent Literature 1: Japanese Patent Laid-Open No. 2000-030751
Patent Literature 2: Japanese Patent Laid-Open No. 2001-307781

SUMMARY

An object of the present invention is to provide a secondary battery system capable of limiting shortening of the product life of a secondary battery during storage and a charge and discharge method for the secondary battery system.

To achieve the above-described object, according to the present invention, there is provided an exemplary aspect of the secondary battery system that controls charge and discharge of a secondary battery having a progressively degrading SOC that is an SOC at which the battery performance degrades during storage, the secondary battery system including:

a controller that detects the SOC of the secondary battery, charges the secondary battery with electric power from an electric power supply source, and supplies a load with electric power discharged from the secondary battery; and an information processor that holds a first threshold value set in advance and lower than the progressively degrading SOC of the secondary battery, and a second threshold value set in advance and higher than the progressively degrading SOC, makes said controller continue an operation to charge the secondary battery from the first threshold value to the second threshold value at the time of charging the secondary battery based on the value of the SOC of the secondary battery detected by said controller, and makes said controller continue an operation to discharge the secondary battery from the second threshold value to the first threshold value at the time of discharging the secondary battery based on the value of the SOC of the secondary battery detected by said controller.

According to the present invention, there is also provided an exemplary aspect of the charge and discharge method for a secondary battery system for controlling charge and discharge of a secondary battery having a progressively degrading SOC that is an SOC at which the battery performance degrades during storage, the method including:

providing a controller that detects the SOC of the secondary battery, charges the secondary battery with electric power from an electric power supply source, and supplies a load with electric power discharged from the secondary battery; and operating a computer so that the computer holds a first threshold value set in advance and lower than the progressively degrading SOC of the secondary battery, and a second threshold value set in advance and higher than the progressively degrading SOC, makes the controller continue an operation to charge the secondary battery from the first threshold value to the second threshold value at the time of charging the secondary battery based on the value of the SOC of the secondary battery detected by the controller, and makes the controller continue an operation to discharge the secondary battery from the second threshold value to the first threshold value at the time of discharging the secondary battery based on the value of the SOC of the secondary battery detected by the controller.

EXEMPLARY EMBODIMENT

The present invention will be described with reference to the drawings.

Figure 1:
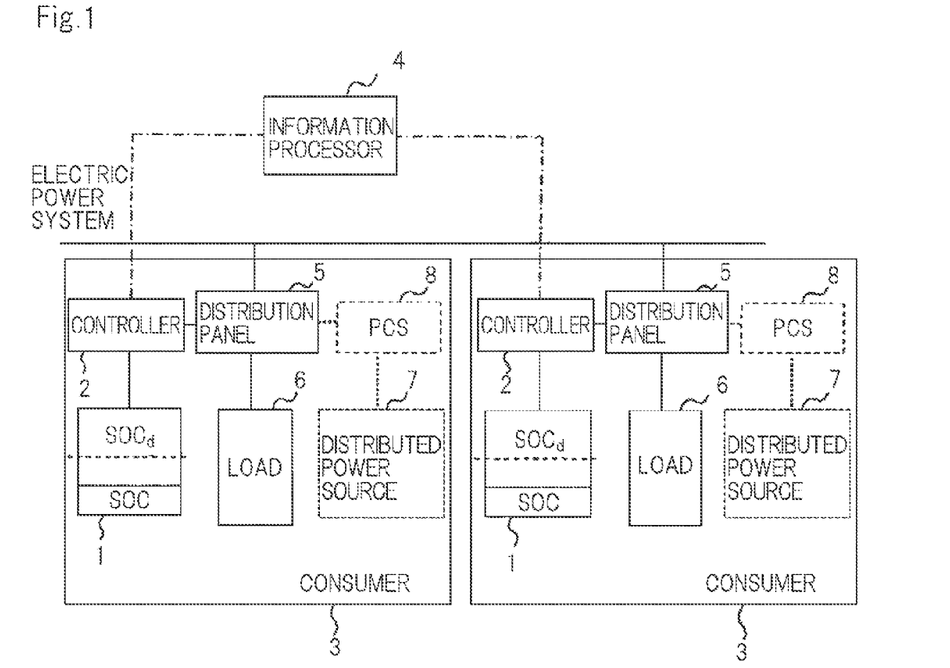
FIG. 1 is a block diagram showing an example of a configuration of a secondary battery system of the exemplary embodiment.
Figure 2:
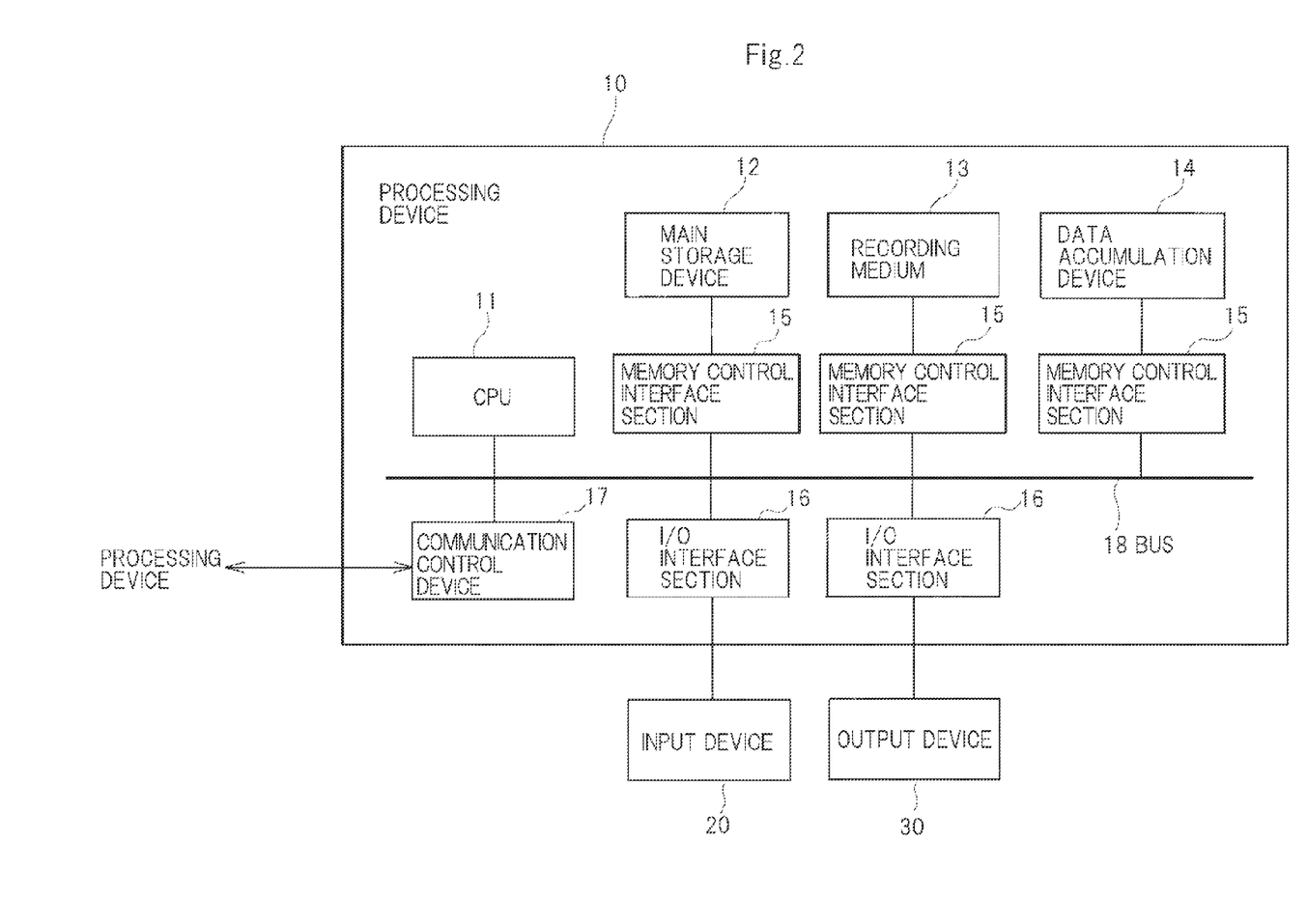
FIG. 2 is a block diagram showing an example of a configuration of an information processor shown in FIG. 1.

FIG. 1 is a block diagram showing an example of a configuration of a secondary battery system of an exemplary embodiment. FIG. 2 is a block diagram showing an example of a configuration of an information processor shown in FIG. 1.

As shown in FIG. 1, the secondary battery system of the exemplary embodiment includes a plurality of consumers 3 connected to an electric power system and each having lithium-ion secondary battery (hereinafter referred to simply as "secondary battery") 1 and controller 2 that charges and discharges secondary battery 1, and information processor 4 that controls controller 2 for each consumer 3 so that a charge and discharge method for the secondary battery system of the exemplary embodiment is realized.

Consumer 3 is a power electric user (a factory, a building, a facility, a house or the like) having load 6, e.g., various electrical appliances and a heat-pump-type hot-water supply system which consume electric power supplied from the electric power system or secondary battery 1. A number of loads provided at consumer 3 are collectively shown as load 6 in FIG. 1. Secondary battery 1 is connected to the electric power system through controller 2 and distribution panel 5 provided at consumer 3. Consumer 3 may include distributed power source 7 such as the above-described renewable power source, a fuel cell, an independent power generator or a gas cogeneration system. In such a case, distributed power source 7 is connected to the electric power system through power control system (PCS) 8 for distributed power source 7 and distribution panel 5.

Information processor 4 and controllers 2 provided at consumers 3 are connected to each other through a well-known communication means so that information and commands or the like can be transmitted and received therebetween. As the communication means, a well-known wireless communication means or a well-known cable communication means may be used. As a wireless communication means, a well-known Zigbee wireless communication system or the like using a radiofrequency in a 950 MHz band, for example, is conceivable. As a cable communication means, a well-known power line communication (PLC) system or the like that transmits and receives information by using a distribution line (power line), for example, is conceivable.

While an example of a configuration in which information processor 4 controls controller 2 and secondary battery 1 of two consumers 3 adjacent to and connected to the electric power system is illustrated in FIG. 1, consumers 3 in regions located apart from each other may have controllers 2 and secondary batteries 1 to be controlled by information processor 4. The number of consumers 3 including controllers 2 and secondary batteries 1 to be controlled may be three or more, not limited to two.

To each secondary battery 1, electric power necessary for charging is supplied from the electric power system or distributed power source 7 and is used to level off peak demand in the electric power system, for example. A manganese-based lithium ion secondary battery, for example, is used as secondary battery 1. The manganese-based lithium ion secondary battery refers to a battery in which the main component of the positive-electrode material is lithium manganate ($Li_xMn_yO_z$ where x is about 1, about 0.65 or about 0.1 to 0.5; y is about 2; and z is about 4). The composition ratios of Li, Mn and O are not limited to these values. A material having lithium manganate as a main component serves as the positive-electrode material. The material of the positive electrode may contain any of various substances such as Al, Mg, Cr, Fe, Co, Ni and Cu. The exemplary embodiment can be applied not only to the manganese-based lithium-ion secondary battery but also to any other secondary battery if the performance of the battery degrades rapidly at a particular SOC.

The dotted line on secondary battery 1 shown in FIG. 1 indicates a particular SOC at which degradation of the performance of secondary battery 1 progresses rapidly during storage (hereinafter referred to as "progressively degrading $SOC_d$"). The solid line on secondary battery 1 shown in FIG. 1 schematically indicates an accumulated amount of electricity (SOC) with respect to the capacity of secondary battery 1. Dotted and solid lines on secondary batteries 1 shown in FIGS. 3 and 4 to be used in descriptions made below also indicate the same.

While FIG. 1 shows an example in which the capacities of secondary batteries 1 of consumers 3 are equal to each other, the capacities of secondary batteries 1 may differ from each other. Also, while FIG. 1 shows an example in which each consumer 3 includes one secondary battery 1, the number of secondary batteries 1 provided at consumer 3 is not limited to one, if each secondary battery 1 can be individually controlled by controller 2. Secondary battery 1 may have a configuration such that unit battery packs having a plurality of secondary batteries (cells) housed in one package can be charged and discharged as a whole battery pack, or unit cells can be individually charged and discharged.

Controller 2 can be realized by means of a well-known power control system (PCS) including a well-known charging device and protective device manufactured according to the performance and characteristics of secondary battery 1 provided from the manufacturer or seller of secondary battery 1, for example, and a well-known bidirectional inverter that converts alternating-current electric power supplied from the electric power system into direct-current electric power accumulable in secondary battery 1 and converts direct-current electric power discharged from secondary battery 1 into alternating-current electric power connectable to the electric power system. Controller 2 also includes a communication means for transmitting information to and receiving information from information processor 4 shown in FIG. 1. The charging device and the protective device charge or discharge secondary battery 1 according to an instruction from information processor 4.

Ordinarily, the protective device detects the SOC of secondary battery 1 and the value of a current input to secondary battery 1 and the value of a current output from secondary battery 1, and the charging device switches the charge current (constant current) and the charge voltage (constant voltage) based on the SOC and the current value detected by the protective device. Since the SOC and the output voltage of secondary battery 1 correspond to substantially one-to-one to each other in ordinary cases, controller 2 may detect the value of the output voltage of secondary battery 1 instead of the SOC. If the SOC of secondary battery 1 detected by controller 2 is an analog value, controller 2 may include an A/D converter for converting the value of the SOC into a digital value.

Information processor 4 is installed, for example, in a centralized control room operated by an electric power company or a management company that manages the electric power system, receives the value of the SOC of each secondary battery 1 transmitted from the corresponding controller 2 at the time of charting or discharging secondary battery 1, and transmits an instruction to controller 2 for consumer 3 based on the value of the SOC received, thereby controlling charging or discharging of secondary battery 1. Information processor 4 can be realized, for example, by means of a computer shown in FIG. 2.

The computer shown in FIG. 2 includes processing device 10 that executes a predetermined process according to a program, input device 20 for inputting a command, information or the like to processing device 10, and an output device 30 for outputting results of processing performed by processing device 10.

Processing device 10 includes CPU 11, main storage device 12 that temporarily holds information necessary for processing performed by CPU 11, recording medium 13 on which a program for making CPU 11 execute the process according to the exemplary embodiment is recorded, data accumulation device 14 in which values including the rated capacity, the maximum SOC, the minimum SOC, first threshold value $SOC_L$ described later and second threshold value $SOC_U$ described later for each secondary battery 1 are stored, memory control interface section 15 that controls data transfer between main storage device 12, recording medium 13 and data accumulation device 14, I/O interface section 16 for interfacing between input device 20 and output device 30, and communication control device 17 for transmitting information and commands to each controller 2 and receiving information and commands from each controller 2. These components are connected to each other through bus 18.

Processing device 10 controls charging and discharging of secondary battery 1 at each consumer 3 through controller 2 by executing the process described later in accordance with the program recorded on recording medium 13. Recording medium 13 may be a magnetic disk, a semiconductor memory, an optical disk or any other recording medium. It is not necessarily required that data accumulation device 14 be provided in processing device 10. Data accumulation device 14 may be an independent device.

The charge and discharge method for the secondary battery system of the exemplary embodiment will now be described.

In the secondary battery system of the exemplary embodiment, control is performed so that the charge operation or the discharge operation is continued through each progressively degrading $SOC_d$ during charging or discharging of secondary battery 1. More specifically, information processor 4 holds first threshold value $SOC_L$ set in advance and lower than progressively degrading $SOC_d$ of secondary battery 1 and second threshold value $SOC_U$ set in advance and higher than progressively degrading $SOC_d$, makes controller 2 continue charging from first threshold value $SOC_L$ to second threshold value $SOC_U$ during charging of secondary battery 1 and makes controller 2 continue discharging from second threshold value $SOC_U$ to first threshold value $SOC_L$ during discharging of secondary battery 1. First threshold value $SOC_L$ and second threshold value $SOC_U$ are set in association with progressively degrading $SOC_d$ of secondary battery 1 by the manufacturer or seller of secondary battery 1 or by a user. First threshold value $SOC_L$ and second threshold value $SOC_U$ of each secondary 5 battery 1 may be transmitted from controller 2 to information processor 4 to be stored in data accumulation device 14 of information processor 4.

For example, in a case where secondary battery 1 is charged with electric power generated by a renewable power source such as a solar battery, there is a possibility of power generation by the renewable power source being stopped to stop charge operation when secondary battery 1 is at progressively degrading $SOC_d$. In such a case, information processor 4 makes controller 2 continue the operation to charge secondary battery 1 by using electric power supplied from the electric power system. In a case where secondary battery 1 is charged only with electric power supplied from the electric power system, scheduling may be performed so that the charge operation is not stopped between first threshold value $SOC_L$ and second threshold value $SOC_U$.

On the other hand, during discharging of secondary battery 1, there is some possibility of the operations of all the electric appliances as load 6 on consumer 3 being stopped to cause stoppage of the discharge operation at progressively degrading $SOC_d$ of secondary battery 1. In such a case, information processor 4 starts the operation of the above-mentioned heat-pump-type hot-water supply system provided at consumer 3, thereby continuing the operation to discharge secondary battery 1 so that the discharge operation is not stopped at progressively degrading $SOC_d$ of secondary battery 1. For this operation, information processor 4 and the above-mentioned heat-pump-type hot-water supply system are connected to each other through a communication means to enable the hot-water supply system to be controlled by information processor 4. As this communication means, a well-known wireless communication means or a well-known cable communication means may be used. When the discharge operation is stopped between first threshold value $SOC_L$ and second threshold value $SOC_U$, information processor 4 may alternatively switch to the charge operation using, for example, electric power from the distribution system to avoid progressively degrading $SOC_d$ of secondary battery 1.

One of the secondary batteries during charging is equivalent, for other secondary batteries, to an electric appliance consuming electric power. In a case where consumer 3 includes a secondary battery (an external secondary battery, e.g., an electric vehicle) that is not included in the secondary battery system in the present exemplary embodiment, therefore, this external secondary battery may be charged to continue the operation to discharge secondary battery 1.

When the discharge operation is stopped at progressively degrading $SOC_d$ of secondary battery 1 in a case where an internal load that consumes electric power is provided in secondary battery 1, the internal load may be connected between the positive and negative terminals of secondary battery 1 to continue the operation to discharge secondary battery 1.

The hot-water supply system, the external secondary battery and the internal load may be connected to information processor 4 through a communication means to be made controllable according an instruction from information processor 4. As this communication means, a well-known wireless communication means or a well-known cable communication means may be used.

In the exemplary embodiment, the method of charging and discharging between first threshold value $SOC_L$ and second threshold value $SOC_U$ is not particularly specified. However, the charge rate may be increased by increasing the charge current and charge voltage within an allowance range for secondary battery 1, for example, during a time period in which charging from first threshold value $SOC_L$ to second threshold value $SOC_U$ is performed. Similarly, the discharge rate may be increased by increasing the current flowing through load 6 within an allowance range for secondary battery 1, for example, during a time period in which discharging from second threshold value $SOC_U$ to first threshold value $SOC_L$ is performed. The charge current and the charge voltage can be controlled by the charging device manufactured according to the performance and characteristics of secondary battery 1 and provided in above-described controller 2.

As a method for increasing the charge rate and the discharge rate of secondary battery 1, a method of sharing distributed power sources 7 and loads 6 is provided at the plurality of consumers 3.

FIGS. 3(a) to 3(c) and FIGS. 4(a) to 4(c) are schematic diagrams showing examples of control of the secondary battery system shown in FIG. 1. FIGS. 3(a) to 3(c) show an example of increasing the speed of the charge operation by sharing distributed power sources 7 and loads 6 provided at two consumers 3. FIGS. 4(a) to 4(c) show an example of increasing the speed of the discharge operation by sharing distributed power sources 7 and loads 6 provided at two consumers 3. FIGS. 3(a) to 3(c) and FIGS. 4(a) to 4(c) show, for the description of the charge and discharge method of the exemplary embodiment, a state where only secondary batteries 1 and controllers 2 are connected to the electric power system.

For example, in a case where each of secondary batteries 1 provided at two consumers 3 is charged with electric power generated by distributed power source 7 provided at consumer 3, when first threshold value $SOC_L$ is reached in one of secondary batteries 1, information processor 4 stops the operation to charge the other secondary battery 1 in which first threshold value $SOC_L$ has not been reached, and charges only one secondary battery 1 in which first threshold value $SOC_L$ has been reached with electric power generated by two distributed power sources 7 to second threshold value $SOC_U$. Thereafter, information processor 4 charges each of two secondary batteries 1 with electric power generated by distributed power source 7 provided at the corresponding consumer 3. After the SOC value of the other secondary battery 1 has reached first threshold value $SOC_L$, information processor 4 stops the operation to charge secondary battery 1 in which second threshold value $SOC_U$ has already been reached, and charges only the other secondary battery 1 in which first threshold value $SOC_L$ has been reached with electric power generated by two distributed power sources 7 to second threshold value $SOC_U$. After the SOC values of all secondary batteries 1 have reached second threshold value $SOC_U$, each secondary battery 1 may again be charged with electric power generated by distributed power source 7 provided at the corresponding consumer 3. In a case where the SOC values of two secondary batteries 1 have simultaneously reached first threshold value $SOC_L$, secondary batteries 1 are charged one after another from first threshold value $SOC_L$ to second threshold value $SOC_U$. After the SOC values of all secondary batteries 1 have reached second threshold value $SOC_U$, each secondary battery 1 may be charged with electric power generated by distributed power source 7 provided at the corresponding consumer 3.

FIG. 3(a) shows an example of the values of the SOCs at a start of charging on two secondary batteries 1. In the example shown in FIG. 3(a), however, the values of the SOCs of secondary batteries 1 are equal to each other at a start of charging. FIG. 3(b) shows a state where the value of the SOC of each secondary battery 1 has reached first threshold value $SOC_L$ from the state shown in FIG. 3(a), the operation to charge secondary battery 1 on the right-hand side is stopped and only secondary battery 1 on the left-hand side is charged to second threshold value $SOC_U$. FIG. 3(c) shows a state following the state shown in FIG. 3(b) where the operation to charge secondary battery 1 on the left-hand side is stopped and only secondary battery 1 on the right-hand side is charged to second threshold value $SOC_U$.

On the other hand, in a case where each of secondary batteries 1 provided at two consumers 3 is discharged, when second threshold value $SOC_U$ is reached in one of secondary batteries 1, information processor 4 stops the operation to discharge the other secondary battery 1 in which second threshold value $SOC_U$ has not been reached, and discharges only one secondary battery 1 in which second threshold value $SOC_U$ has been reached by load 6 provided at consumer 3 to first threshold value $SOC_L$. Thereafter, information processor 4 discharges each of two secondary batteries 1 by load 6 provided at the corresponding consumer 3. After second threshold $SOC_U$ has been reached in the other secondary battery 1, information processor 4 stops the operation to discharge secondary battery 1 in which first threshold value $SOC_L$ has already been reached, and discharges only the other secondary battery 1 in which second threshold value $SOC_U$ has been reached by load 6 provided at consumer 3 to first threshold value $SOC_L$. After the SOC values of all secondary batteries 1 have reached first threshold value $SOC_L$, each secondary battery 1 may again be discharged by load 6 provided at the corresponding consumer 3. In a case where the SOC values of two secondary batteries 1 have simultaneously reached second threshold value $SOC_U$, secondary batteries 1 are discharged one after another from second threshold value $SOC_U$ to first threshold value $SOC_L$. After the SOC values of all secondary batteries 1 have reached first threshold value $SOC_L$, each secondary battery 1 may be discharged by load 6 provided at the corresponding consumer 3.

FIG. 4(a) shows an example of the values of the SOCs at a start of discharging two secondary batteries 1. In the example shown in FIG. 4(a), however, the values of the SOCs of secondary batteries 1 are equal to each other at a start of discharging. FIG. 4(b) shows a state where the value of the SOC of each secondary battery 1 has reached second threshold value $SOC_U$ from the state shown in FIG. 4(a), the operation to discharge secondary battery 1 on the right-hand side is stopped and only secondary battery 1 on the left-hand side is discharged to first threshold value $SOC_L$. FIG. 4(c) shows a state following the state shown in FIG. 4(b) where the operation to discharge secondary battery 1 on the left-hand side is stopped and only secondary battery 1 on the right-hand side is discharged to first threshold value $SOC_L$.

Each of the rate of charge and the rate of discharge between first threshold value $SOC_L$ and second threshold value $SOC_U$ is thus increased. The time that charge or discharge is prolonged in the vicinity of progressively degrading $SOC_d$ can be reduced thereby.

Since electric power generated by shared distributed power sources 7 and electric power to be consumed by shared loads 6 are exchanged between consumers 3 through the electric power system, it cannot be said that the electric power used for charging or discharging secondary batteries 1 between first threshold value $SOC_L$ and second threshold value $SOC_U$ is strictly equal to the electric power generated by shared distributed power sources 7 or the electric power consumed by shared loads 6 at consumers 3. However, it can be said that transfer of electric power in the electric power system as a whole is equivalent to giving and receiving of electric power between consumers 3 sharing distributed power sources 7 and loads 6.

Figure 3:
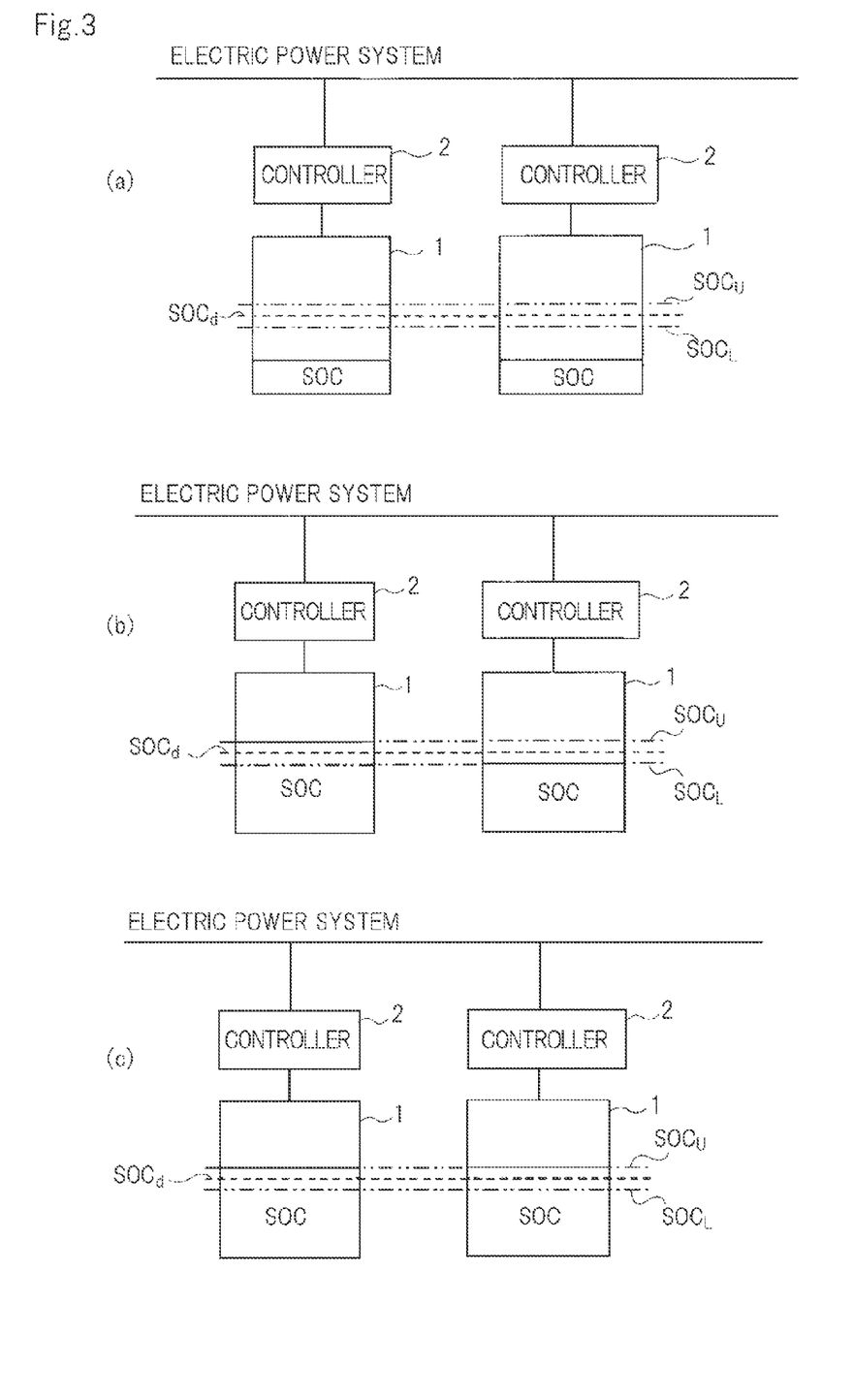
FIG. 3 is a schematic diagram showing an example of control of the secondary battery system shown in FIG. 1.
Figure 4:
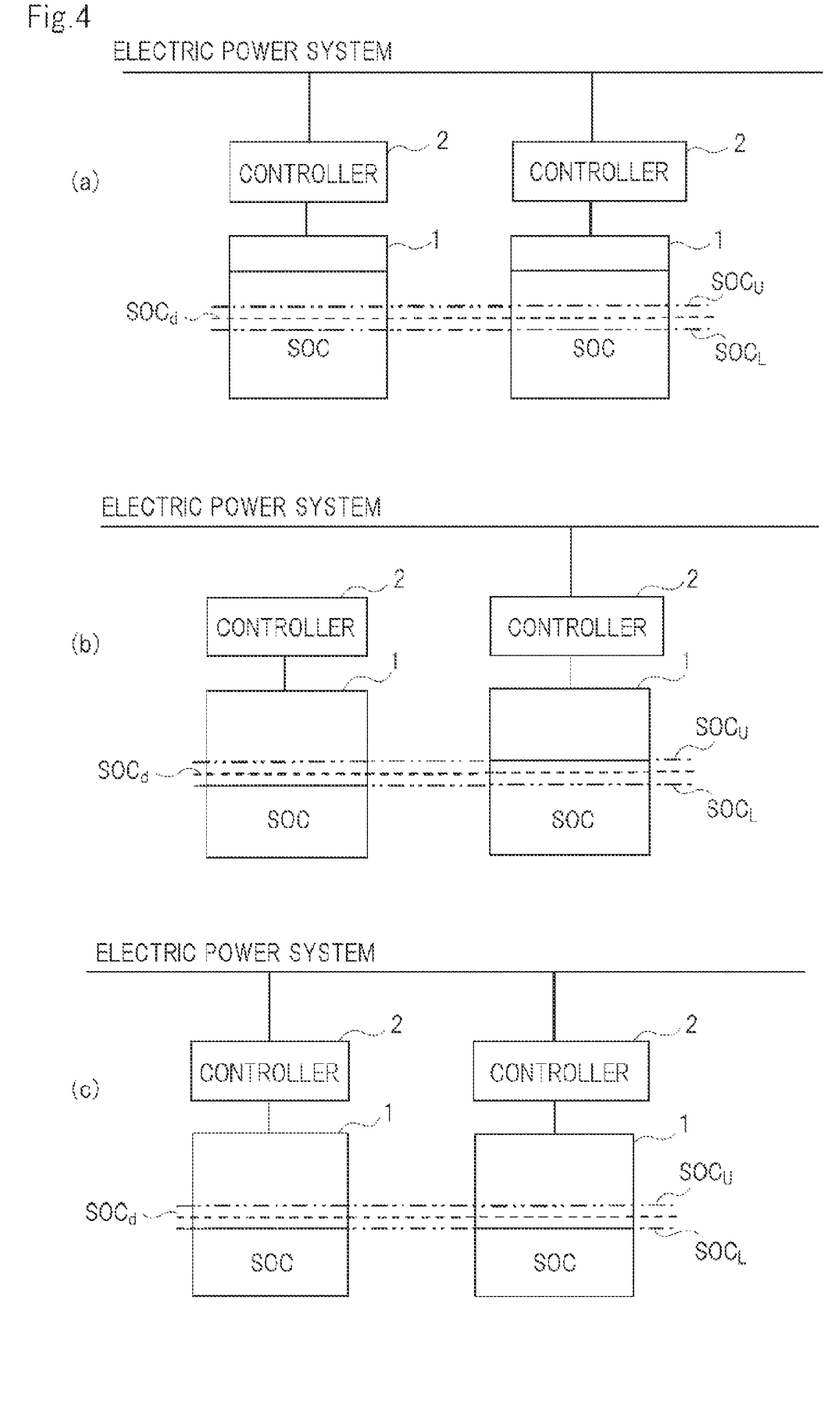
FIG. 4 is a schematic diagram showing an example of control of the secondary battery system shown in FIG. 1.

While an example in which two secondary batteries 1 to be controlled exist is shown in FIGS. 3 and 4, charge and discharge may be performed in the same way in a case where three or more secondary batteries 1 to be controlled exist; secondary batteries 1 are charged or discharged one after another from the one in which first threshold value $SOC_L$ or second threshold value $SOC_U$ is first reached between first threshold value $SOC_L$ and second threshold value $SOC_U$, by using the distributed power sources or the loads at the plurality of consumers.

According to the exemplary embodiment, first threshold value $SOC_L$ that is lower than progressively degrading $SOC_d$ of secondary battery 1 and second threshold value $SOC_U$ that is higher than progressively degrading $SOC_d$ are set in advance, and information processor 4 makes controller 2 continue the charge operation from first threshold value $SOC_L$ to second threshold value $SOC_U$ at the time of charging and makes controller 2 continue the discharge operation from second threshold value $SOC_U$ to first threshold value $SOC_L$ at the time of discharging, so that stoppage of the charge operation or the discharge operation at progressively degrading $SOC_d$ of secondary battery 1 does not occur. Therefore, shortening of the product life of secondary battery 1 during storage can be limited.

While an example in which secondary batteries 1 have constant progressively degrading $SOC_d$ has been described, progressively degrading $SOC_d$ may vary depending on the secondary battery 1 operation time or the number of times charge and discharge are performed. Accordingly, the above-described first threshold value $SOC_L$ and second threshold value $SOC_U$ may be changed according to the operation time or the number of times charge and discharge are performed.

Also, while an example in which each secondary battery 1 has only one progressively degrading $SOC_d$ has been described, each secondary battery 1 may alternatively have a plurality of values of progressively degrading $SOC_d$. In such a case, the above-described charge and discharge method may be applied with respect to each progressively degrading $SOC_d$.

The present invention has been described by referring to an exemplary embodiment. However, the present invention is not limited to the above-described exemplary embodiment. Various changes understandable by those skilled in the art in the scope of the present invention can be made in the configuration and details of the present invention.

The present application claims priority based on Japanese Patent Application No. 2011-202093 filed on Sep. 15, 2011, the entire contents of which are incorporated herein by reference in its entirety.

The invention claimed is:

1. A secondary battery system comprising:
a controller configured to detect a value that indicates a state of charge of a secondary battery, and to control a charging operation and a discharging operation of the secondary battery; and
an information processor configured to cause the controller to continue the charging operation and the discharging operation so that the charge operation or the discharge operation is continued through a progressively degrading state of charge at which a battery performance of the secondary battery degrades during storage,
wherein the controller is further configured to continue the charging operation and the discharging operation of the secondary battery during a period in which the value indicated the state of charge is between a first threshold value that is lower than the progressively degrading state of charge and a second threshold value that is higher than the progressively degrading state of charge, and
wherein the controller is further configured to increase a charge rate or a discharge rate of the secondary battery during a period in which the value indicating the state of charge is between the first threshold value and the second threshold value than during a period in which the value indicating the state of charge is lower than the first threshold value or than during a period in which the value indicating the state of charge is higher than the second threshold value.

2. The secondary battery system according to claim 1, wherein the information processor is further configured to cause the controller to switch between the charging operation and the discharging operation of the secondary battery so that the value that indicates the state of charge does not reach the progressively degrading state of charge.

3. The secondary battery system according to claim 1, further comprising:
   a plurality of secondary batteries, each having a respective value indicating a respective state of charge; and
   a plurality of controllers provided in correspondence with the plurality of secondary batteries,
   wherein the information processor is further configured to cause one or more of the controllers to continue a discharging operation of the secondary batteries from the second threshold value to the first threshold value, and to cause another controller to stop the discharging operation of the secondary batteries whose respective values of the state of charge are higher than the second threshold value.

4. The secondary battery system according to claim 1, further comprising:
   a plurality of secondary batteries, each having a respective value indicating a respective state of charge; and
   a plurality of controllers provided in correspondence with the plurality of secondary batteries,
   wherein the information processor is further configured to cause one or more of the controllers to continue a charging operation of the secondary batteries from the first threshold value to the second threshold value, and to cause another controller to stop the charging operation of the secondary batteries whose respective values of the state of charge are lower than the first threshold value.

5. The secondary battery system according to claim 1, wherein the information processor is further configured to use the output voltage of the secondary battery as the value of the state of charge.

6. A charge and discharge method for a secondary battery system, the method comprising:
   operating a controller to detect a value that indicates a state of charge of a secondary battery, and to control a charging operation and a discharging operation of the secondary battery;
   operating a computer to cause the controller to continue the charging operation and the discharging operation of the secondary battery so that the charge operation or the discharge operation is continued through a progressively degrading state of charge at which a battery performance of the secondary battery degrades during storage;
   operating the computer to cause the controller to continue the charging operation and the discharging operation of the secondary battery during a period in which the value indicating the state of charge is between a first threshold value that is lower than the progressively degrading state of charge and a second threshold value that is higher than the progressively degrading state of charge; and
   operating the computer to cause the controller to increase a charge rate or a discharge rate of the secondary battery during the period in which the value indicating the state of charge is between the first threshold value and the second threshold value than during a period in which the value indicating the state of charge is lower than the first threshold value or than during a period in which the value indicating the state of charge is higher than the second threshold value.

7. The charge and discharge method of claim 6 further comprising:
   operating the computer to cause the controller to switch between the charging operation and the discharging operation of the secondary battery so that the value that indicates the state of charge does not reach the progressively degrading state of charge.

8. The charge and discharge method of claim 6, further comprising:
   operating the computer to cause the controller to control a discharging operation of a plurality of secondary batteries, each having a respective value indicating a respective state of charge, such that the plurality of secondary batteries are discharged from the second threshold value to the first threshold value, and to stop the discharging operation of the plurality of secondary batteries when the respective values are higher than the second threshold value.

9. The charge and discharge method of claim 6, further comprising:
   operating the computer to cause the controller to control a charging operation of a plurality of secondary batteries, each having a respective value indicating a respective state of charge, such that the plurality of secondary batteries are charged from the first threshold value to the second threshold value, and to stop the charging operation of the plurality of secondary batteries when the respective values are lower than the first threshold value.

10. The charge and discharge method of claim 6, further comprising:
    using an output voltage of the secondary battery as the value of the state of charge.

11. A computer system comprising:
    a controller configured to detect a value that indicates a state of charge of a secondary battery and to control a charging operation and a discharging operation of the secondary battery, wherein
    the controller is further configured to continue the charging operation and the discharging operation of the secondary battery so that the charge operation or the discharge operation is continued through a progressively degrading state of charge at which a battery performance of the secondary battery degrades during storage,
    the controller is further configured to continue the charging operation or the discharging operation of the secondary battery during a period in which the value indicating the state of charge is between a first threshold value that is lower than the progressively degrading state of charge and a second threshold value that is higher than the progressively degrading state of charge, and
    the controller is further configured to increase a charge rate or a discharge rate of the secondary battery during the period in which the value indicating the state of charge is between the first threshold value and the second threshold value than during a period in which the value indicating the state of charge is lower than the first threshold value or than during a period in which the value indicating the state of charge is higher than the second threshold value.

12. The computer system according to claim 11, wherein the controller is further configured to switch between the charging operation and the discharging operation of the secondary battery so that the value that indicates the state of charge does not reach the progressively degrading state of charge.

13. The computer system according to claim 11, further comprising:
- a plurality of secondary batteries, and
- a plurality of controllers provided in correspondence with the plurality of secondary batteries, wherein
- one or more of the plurality of controllers is configured to control a discharging operation of a plurality of secondary batteries, each having a respective value indicating a respective state of charge, such that the plurality of secondary batteries are discharged from the second threshold value to the first threshold value, and another of the plurality of controllers is configured to stop the discharging operation of the plurality of secondary batteries when the respective values are higher than the second threshold value.

14. The computer system according to claim 11, further comprising:
- a plurality of secondary batteries, and
- a plurality of controllers provided in correspondence with the plurality of secondary batteries, wherein
- one or more of the plurality of controllers is configured to control a charging operation of a plurality of secondary batteries, each having a respective value indicating a respective state of charge, such that the plurality of secondary batteries are charged from the first threshold value to the second threshold value, and another of the plurality of controllers is configured to stop the charging operation of the plurality of secondary batteries when the respective values are lower than the first threshold value.

15. The computer system according to claim 11, wherein the controller is further configured to use an output voltage of the secondary battery as the value of the state of charge.

* * * * *